United States Patent [19]
Sisson et al.

[11] 3,916,710
[45] Nov. 4, 1975

[54] TRANSMISSIONS

[75] Inventors: Ronald L. Sisson; James E. Shellberg, both of Jackson, Mich.

[73] Assignee: Clark Equipment Company, Buchanan, Mich.

[22] Filed: Sept. 9, 1974

[21] Appl. No.: 504,585

Related U.S. Application Data

[62] Division of Ser. No. 392,139, Aug. 27, 1973, Pat. No. 3,858,455.

[52] U.S. Cl. ............... 74/331; 74/359; 74/360
[51] Int. Cl.$^2$ ............................................ F16H 3/08
[58] Field of Search ............ 74/331, 357, 359, 360, 74/745

[56] References Cited
UNITED STATES PATENTS

| | | | |
|---|---|---|---|
| 679,365 | 7/1901 | Darling | 74/359 |
| 3,675,508 | 7/1972 | Blank | 74/745 |

FOREIGN PATENTS OR APPLICATIONS

| | | | |
|---|---|---|---|
| 717,450 | 10/1954 | United Kingdom | 74/359 |

*Primary Examiner*—Samuel Scott
*Assistant Examiner*—John Reep
*Attorney, Agent, or Firm*—Ernst H. Ruf

[57] ABSTRACT

A family of multispeed constant-mesh-gear reversible transmissions has a basic structure that includes five drivingly connected shafts, with all of these shafts lying in a common plane. A plurality of gear trains selectively drives the output shaft at various speed ratios, and pluralities of clutches are used for connecting several of the shafts and for connecting various ones of the gears to various shafts for conjoint rotation therewith. Several embodiments of connecting means are used for connecting the output shaft with at least one of the several gears.

3 Claims, 3 Drawing Figures

TRANSMISSIONS

This is a division of application Ser. No. 392,139 filed Aug. 27, 1973 now U.S. Pat. No. 3,858,455.

BACKGROUND OF THE INVENTION

The field of art to which this invention pertains includes power transmission mechanisms and more specifically such mechanisms as have multiple forward and reverse constant-mesh gearing.

In multiple-speed gear transmissions, it is desirable to arrange the transmissions' major components, or basic structure, in such a way that a variety of additional components or modifications may easily be added to this basic mechanism or structure. Transmissions of this general type are mainly used in off-highway heavy duty vehicles and construction equipment which often are manufactured for specific requirements in only limited numbers. Thus, having a basic transmission structure which can be readily adapted to meet unique criteria is of paramount importance. Not only is cost reduced, but dependability is improved.

This invention sets forth a family of transmissions that starts with the basic structure that is then modified to meet particular requirements of both installation and performance.

The family of transmissions of this invention has a common denominator in the fact that the five drivingly connected shafts lie in a common plane, preferably vertical. This allows the production of a family of constant-width transmissions, which not only facilitates installation features but also permits the use of large numbers of common parts. These transmissions include embodiments wherein the output shaft is parallel but vertically displaced from the input shaft, with transmissions of this type generally being designated "drop" transmissions. In addition, these transmissions may be equipped with front and rear directed output shafts.

SUMMARY OF THE INVENTION

In carrying out this invention in several preferred embodiments thereof, all of these embodiments have a common basic structure which provides a transmission having an input shaft, a first shaft lying in a common plane with the input shaft, a second shaft axially aligned with the input shaft, a third shaft lying in a common plane with the input shaft and an output shaft, with all of these shafts lying in a common plane. A first gear is fixed to the input shaft and drivingly connected with a second gear journalled for rotation on the first shaft. A first clutch means connects the input shaft with the second shaft, and a second clutch means connects the second gear to the first shaft for conjoint rotation therewith. A third gear is fixed to the second shaft and in mesh with a fourth gear fixed to the first shaft. A fifth gear is journalled for rotation on one of the first and second shafts, while a third clutch means connects the fifth gear to one of the first and second shafts for conjoint rotation therewith. In addition, there are means for drivingly connecting the output shaft, via the third shaft, with at least the fifth gear.

One embodiment of this driving means may include a sixth gear fixed to the first shaft and in mesh with a seventh gear fixed to the third shaft. An eighth gear is journalled for rotation on the third shaft and in mesh with the fifth gear, with a fourth clutch means connecting the eighth gear to the third shaft for conjoint rotation therewith. The ninth gear is journalled for rotation on the third shaft, and a fifth clutch means connects the ninth gear to the third shaft for conjoint rotation therewith. Tenth and eleventh gears fixed to the output shaft are in mesh with the eighth and ninth gears, respectively.

Another embodiment of the connecting means may include a sixth gear fixed to the first shaft and in mesh with the seventh gear fixed to the third shaft. An eighth gear is journalled for rotation on the first shaft and in mesh with the fifth gear, with a fourth clutch means connecting the eighth gear to the first shaft. A ninth gear is journalled for rotation on the third shaft and a fifth clutch means connects the ninth gear to the third shaft, with the ninth gear being in mesh with an eleventh gear fixed to the output shaft. A tenth gear is mounted for rotation on the third shaft and in mesh with the eighth gear and with a twelfth gear fixed to the output shaft. A sixth clutch means connects the tenth gear to the third shaft for conjoint rotation therewith.

A further embodiment of the connecting means includes sixth and eighth gears journalled for rotation on the first shaft with a fourth clutch means connecting the sixth and eighth gears to the first shaft. The eighth gear is in mesh with the fifth gear. A seventh gear, fixed to the third shaft and in mesh with the sixth gear, is also in mesh with an eleventh gear journalled for rotation on the output shaft. A ninth gear is fixed to the third shaft and in mesh with a tenth gear also journalled for rotation on the output shaft. Means are provided for alternately connecting the tenth and eleventh gears to the output shaft for conjoint rotation therewith.

If desired, the output shaft gears may be journalled for rotation on the output shaft and selectively connected or disconnected with respect to the output shaft, so as to permit towing of the vehicle, equipped with one of these transmissions, without rotating any of the transmission components except for the output shaft.

The principal objects, features and advantages of this invention will be more readily understood by a person skilled in the art when following the detailed description in conjunction with the drawings.

DESCRIPTION OF THE PREFERRED EMBODIMENTS

Figure 1:
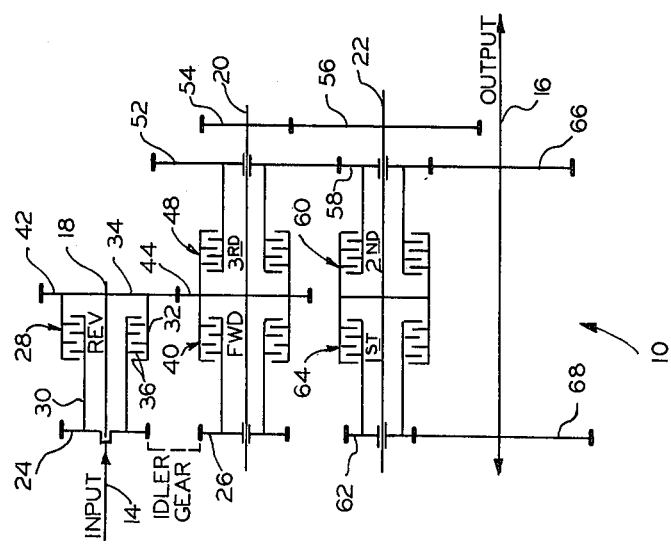
FIG. 1 is a schematic representation of a three speed version of the drop transmission embodying this invention.

Referring now to FIG. 1, the reference numeral 10 generally denotes a transmission of a constant-mesh-gear type, having a housing (not shown) in which an input shaft 14, output shaft 16 and shafts 18, 20 and 22 are journalled for rotation.

Input shaft 14 is driven, for example, by means of the turbine of a hyrdodynamic torque converter (not shown) of known construction to which shaft 14 is connected, with the torque converter being in turn connected to any suitable source of power, such as an internal combustion engine (not shown). In addition, the torque converter impeller may also drive one or more pumps (not shown) of any well known construction, with at least one of the pumps serving to provide pressurized fluid to operate the various fluid actuated clutches as well as lubricate the gears and bearings associated with transmission 10.

Connected to input shaft 14 is an input gear 24 which is drivingly connected by means of idler gear (not shown) with a gear 26, with gear 26 being journalled for rotation on shaft or countershaft 20. Input shaft 14 can be connected to shaft 18, which is axially aligned with shaft 14, for conjoint rotation therewith by means of a clutch 28. Clutch 28, which may be a multiple plate, fluidactuated-type clutch of well known construction, includes a hub 30 connected to gear 24 by a suitable means, such as welding; a drum 32 which has a web 34 integral therewith, with web 34 being fixed to shaft 18 by any suitable means, such as welding; and a plurality of interleaved friction plates 36 splined alternately to hum 30 and drum 32. Clutch 28 is engaged by supplying pressurized fluid behind a piston (not shown) which serves to press plates 36 together so that hub 30 is frictionally connected to drum 32 through plates 36.

Gear 26 can be connected to shaft or countershaft 20 for conjoint rotation therewith by means of a fluid-actuated multiple plate clutch 40 which is substantially similar to clutch 28, and so will not be described further.

At this time, it will be noted that a gear 42 is integral with drum 32 of clutch 28 and meshes with another gear 44, which is integral with the drum of clutch 40. It should be clear at this time that shaft 18 is axially aligned with input shaft 14, and that shaft 20 is vertically aligned or in the same vertical plane as input shaft 14. Shaft 18 and shaft 20 are interconnected by means of meshing gears 42 and 44 so that for any given direction of rotation of one of these shafts, the other shaft will rotate in the opposite direction. In addition, since gear 24 is drivingly interconnected, via an idler gear, with gear 26, they, therefore, rotate in the same direction. Thus, engagement of clutch 28 conditions transmission 10 for what may be arbitrarily designated "reverse drive" and engagement of clutch 40 conditions the transmission for what may again be arbitrarily termed "forward drive", depending, of course, on the direction of rotation of input shaft 14.

A gear 52 is journalled for rotation on shaft or countershaft 20 and can be connected thereto for conjoint rotation therewith by engagement of another multiple plate fluid-actuated-type clutch 48, with clutch 48 being allochiral to clutch 40 and sharing a common web therewith. Clutch 48 again is substantially similar to previously described clutch 28. In addition, a gear 54 is fixed to countershaft 20 for conjoint rotation therewith.

Shaft or countershaft 22, which is rotatably journaled below shaft or countershaft 20 is thusly also vertically aligned or in the same vertical plane as input shaft 14, has fixedly secured thereto a gear 56 which is in constant mesh with gear 54. A gear 58 is journalled for rotation on shaft 22 and can be connected thereto for conjoint rotation therewith by means of a clutch 60 which again is substantially similar to previously described clutch 28. Gear 58 is in constant mesh with gear 52. Another gear 62 is journalled for rotation on shaft 22 and can be connected thereto for conjoint rotation therewith by means of another similar clutch 64.

Output shaft 16, which is also vertically aligned or in the same vertical plane as input shaft 14, has fixedly secured thereto a gear 66 and a gear 68 for conjoint rotation therewith, with gears 66 meshing with gear 58 and gear 68 meshing with gear 62.

While output shaft 16 is shown in FIG. 1 as extending from both the rear and front of the transmission housing, it should be understood that, if desired, it could extend only on one side of the housing, and that its opposite end could be provided with a co-axial auxiliary output shaft (not shown) that could be selectively engageable with output shaft 16 by means of a conventional sliding tooth clutch (not shown). Furthermore, if desired, output shaft gears 66 and 68 could be rotatably journalled on output shaft 16 so that they could be selectively engageable therewith by means of, for example, conventional sliding tooth clutches (not shown). Disconnecting gears 66 and 68 from shaft 16 permits towing of the vehicle equipped with transmission 10 without rotating any of the transmission components besides output shaft 16.

In view of the foregoing description, it will be apparent, since all of the gears are in constant mesh, that a first forward speed ratio is provided by the engagement of clutches 40 and 64 so that output shaft 16 is driven through the gear train comprising gears 24, 26, 54, 56, 62 and 68. A second higher speed ratio is provided by continued engagement of clutch 40 and the engagement of clutch 60 (instead of clutch 64) so that output shaft 16 is driven through a gear train comprising gears 24, 26, 54, 56, 58 and 66. A third, or high speed, ratio is provided by the continued engagement of clutch 40 and the engagement of clutch 48 (instead of clutch 60) so that output shaft 16 is driven through a gear train comprising gears 24, 26, 52, 58 and 66. By engaging clutch 28 and clutch 64, a low reverse speed ratio is provided through gears 42, 44, 54, 56, 62 and 68. By releasing clutch 64 and engaging clutch 60, a second, or intermediate, reverse speed ratio is provided through gears 42, 44, 54, 56, 58 and 66. A third, or high, reverse speed ratio is provided through gears 42, 44, 52, 58 and 66.

It should be noted that, in this transmission, input shaft 14 and output shaft 16 are parallel and lie in a common vertical plane. In addition, input shaft 14 and shaft 18 are axially aligned, with shafts 20 and 22 also being parallel. The utilization of this arrangement allows the production of a compact, spacesaving transmission that is also easy to manufacture.

DESCRIPTION OF THE FIG. 2 MODIFICATION

Figure 2:
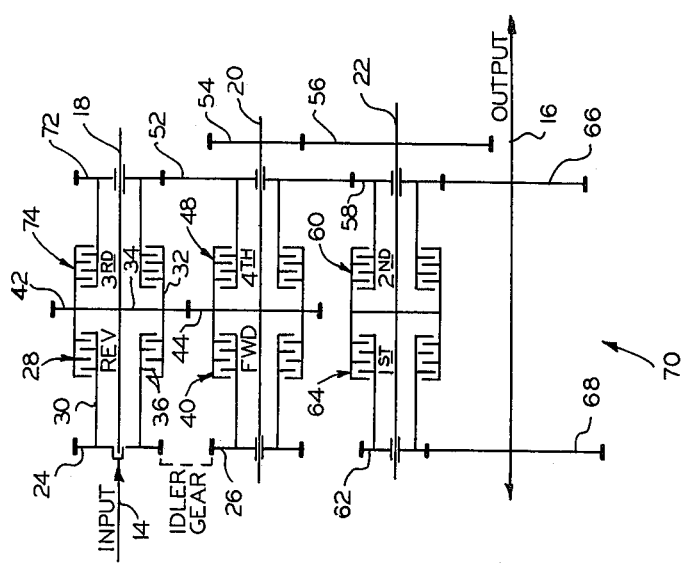
FIG. 2 is a schematic representation of a four speed version of the transmission shown in FIG. 1.

Referring now to FIG. 2, there is shown a modification of this invention which provides four speed ratios in both the forward and reverse direction. To the extent that this embodiment is the same as previously described transmission 10 in FIG. 1, reference is made here to this preceding description, with like reference numerals being applied to like parts. A comparison of FIGS. 1 and 2 will show that in transmission 70 (FIG. 2), an additional gear 72 has been journalled for rotation on shaft 18 and can be connected thereto for conjoint rotation therewith by means of an additional clutch 74 which again is substantially similar to previously described clutch 28. Gear 72 is in constant mesh with gear 52. It should also be noted that while the addition of gear 72 and clutch 74 adds another speed ratio to transmission 70, some of the speed ratios are different from those of transmission 10 in FIG. 1.

By engaging clutch 40, the transmission is conditioned for forward drive, but by disengaging clutch 40, and by engaging clutch 28, the transmission is conditioned for reverse drive. At this point it will be seen, since all of the gears are in constant mesh, that a first speed ratio is provided, in both forward and reverse, by engaging clutch 64 so that output shaft 16 is driven through the gear trains comprising either gears 24, 26, 54, 56, 62 and 68 or 42, 44, 54, 56, 62 and 68. Second speed ratio is provided, in both forward and reverse, by engaging clutch 60 so that output shaft 16 is driven through the gear trains comprising either gears 24, 26, 54, 56, 58 and 66 or 42, 44, 54, 56, 58 and 66. A third speed ratio is provided, in both forward and reverse, by engaging clutch 74 so that output shaft 16 is driven through the gear trains comprising either gears 24, 26, 44, 42, 72, 52, 58 and 66 or 72, 52, 58 and 66. A fourth speed ratio is provided, in both forward and reverse, by engaging clutch 48 so that output shaft 16 is driven through the gear trains comprising either gears 24, 26, 52, 58 and 66 or 42, 44, 52, 58 and 66.

DESCRIPTION OF THE FIG. 3 MODIFICATION

Figure 3:
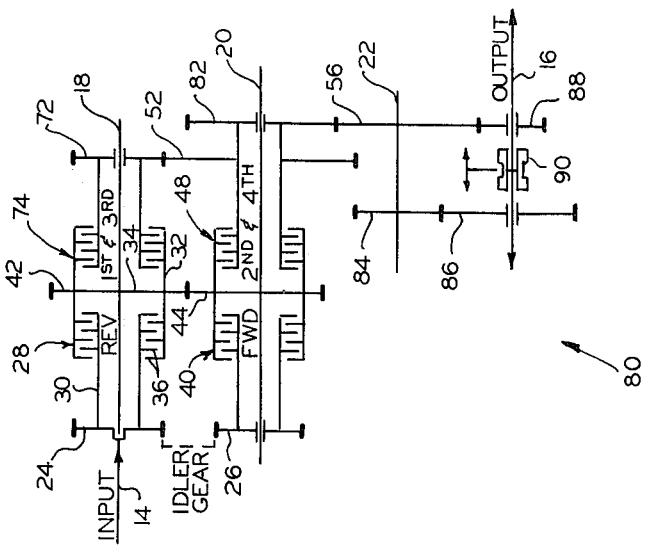
FIG. 3 is a schematic representation of a two speed with mechanical range version of the transmission shown in FIG. 2.

Referring now to FIG. 3, there is shown a modification of this invention which provides two speed ratios in both forward and reverse direction, in both a low and a high range. Thus, transmission 80 is capable of providing four forward and reverse speeds, but a shift is required between the first and second ranges. To the extent that this embodiment is the same as previously described transmissions 10 and 70 in FIGS. 1 and 2, respectively, reference is made here to these preceding descriptions, with like reference numerals being applied to like parts. A comparison of transmissions 10 and 70 in FIGS. 1 and 2, respectively, with transmission 80 in FIG. 3 shows that clutches 60 and 64 are not utilized in transmission 80. In addition, a gear 82 is not affixed to, but is journalled for rotation on, shaft 20 with gear 82 being connectable to shaft 20 by means of clutch 48. Gear 82 is in constant mesh with gear 56. A gear 84 is fixed to shaft 22 and is in constant mesh with a further gear 86 that is journalled for rotation on output shaft 16. Another gear 88 is also journalled for rotation on output shaft 16 and is in constant mesh with gear 56. Output shaft 16 also has secured thereto connecting means 90 for alternately connecting gears 86 and 88 to output shaft 16 for conjoint rotation therewith. Connecting means 90 may, for example, be a conventional sliding tooth clutch which can be shifted in any desired manner to axially couple either gear 86 or gear 88 to output shaft 16. It should be clear that connecting means 90 can be shifted to neutral position, i.e., in which neither of gears 86 and 88 is coupled to output shaft 16. This neutral position permits towing of the vehicle equipped with transmission 80 without rotating any other transmission components besides output shaft 16.

By engaging clutch 40, the transmission is conditioned for forward drive, but by disengaging clutch 40 and by engaging clutch 28, the transmission is conditioned for reverse drive. At this time it will be seen, since all of the gears are in constant mesh, that a first speed ratio is provided, in both forward and reverse, by engaging clutch 74 so that shaft 22 is driven through the gear trains comprising either gears 24, 26, 44, 42, 72, 52, 82 and 56 or 72, 52, 82 and 56. A second speed ratio is provided, in both forward and reverse, by engaging clutch 48 so that shaft 22 is driven through the gear trains comprising either gears 24, 26, 82 and 56 or 42, 44, 82 and 56. It will also be seen that shaft 22 drives output shaft 16 either through the gear train comprising gears 84 and 86, when connecting means 90 is axially shifted to connect gear 86 to output shaft 16 for conjoint rotation therewith, or through the gear train comprising gears 56 and 88 when connecting means 90 is shifted to connect gear 88 for conjoint rotation with output shaft 16. The connection of gear 86 with output shaft 16 provides first, or low, range drive, whereas, the connection of gear 88 with output shaft 16 provides for a second, or high, range drive. It should be clear that both first and second speed ratios, via clutches 74 and 48, respectively, can be provided in both the low and high ranges previously described. Thus, the operator has two speeds in forward or reverse in each of the two drive ranges, with a shift of connecting means 90 being required to select either of the two ranges.

From the foregoing, it is believed that those familiar with the art will readily recognize and appreciate the novel concepts and features of the present invention. Obviously, while the invention has been described in relation to only a limited number of embodiments, numerous variations, changes and substitutions of equivalents will present themselves to persons skilled in the art and may be made without necessarily departing from the scope and principles of this invention. For example, front power takeoff shafts and/or co-axial auxiliary output shafts, as described with reference to transmission 10 in FIG. 1, may also readily be used in transmissions 70 and 80 shown in FIGS. 2 and 3, respectively. As a result, the embodiments described therein are subject to various modifications, changes and the like, without departing from the scope and spirit of the invention. Consequently, the scope of this invention should be determined solely by reference to the claims appended thereto.

What is claimed is:

1. A transmission comprising:
   a. an input shaft;
   b. a first gear fixed to said input shaft;
   c. a first shaft lying in a common plane with said input shaft;
   d. a second gear journalled for rotation on said first shaft and drivingly connected with said first gear;
   e. a second shaft axially aligned with said input shaft;
   f. first clutch means for connecting said input shaft with said second shaft;
   g. second clutch means for connecting said second gear to said first shaft for conjoint rotation therewith;
   h. a third gear fixed to said second shaft;
   i. a fourth gear fixed to said first shaft and in mesh with said third gear;
   j. a fifth gear journalled for rotation on one of said first and second shafts;
   k. third clutch means for connecting said fifth gear to one of said first and second shafts for conjoint rotation therewith;
   l. a third shaft lying in a common plane with said input shaft;
   m. an output shaft;
   n. a sixth gear fixed to said first shaft;

o. a seventh gear fixed to said third shaft and in mesh with said sixth gear;
p. an eighth gear journalled for rotation on said first shaft and in mesh with said fifth gear;
q. fourth clutch means for connecting said eighth gear to said first shaft for conjoint rotation therewith;
r. a ninth gear journalled for rotation on said third shaft;
s. fifth clutch means for connecting said ninth gear to said third shaft for conjoint rotation therewith;
t. a tenth gear journalled for rotation on said third shaft and in mesh with said eighth gear;
u. sixth clutch means for connecting said tenth gear to said third shaft for conjoint rotation therewith;
v. an eleventh gear fixed to said output shaft and in mesh with said ninth gear; and
w. a twelfth gear fixed to said output shaft and in mesh with said tenth gear, with said output shaft being vertically aligned with said input shaft.

2. A transmission comprising:
a. an input shaft;
b. a first gear fixed to said input shaft;
c. a first countershaft vertically aligned with said input shaft;
d. a second gear journalled for rotation on said first countershaft and drivingly connected with said first gear;
e. a shaft axially aligned with said input shaft;
f. first clutch means for connecting said input shaft with said axially aligned shaft;
g. second clutch means for connecting said second gear to said first countershaft for conjoint rotation therewith;
h. a third gear fixed to said axially aligned shaft;
i. a fourth gear fixed to said first countershaft and in mesh with said third gear;
j. a fifth gear journalled for rotation on one of said first countershaft and said axially aligned shaft;
k. third clutch means for connecting said fifth gear to one of said first countershaft and said axially aligned shaft for conjoint rotation therewith;
l. a second countershaft vertically aligned with said first countershaft;
m. an output shaft vertically aligned with said second countershaft;
n. a sixth gear fixed to said first countershaft;
o. a seventh gear fixed to said second countershaft and in mesh with said sixth gear;
p. an eighth gear journalled for rotation on said first countershaft and in mesh with said fifth gear, and fourth clutch means connecting said eighth gear to said first countershaft for conjoint rotation therewith;
q. a ninth gear journalled for rotation on said second countershaft;
r. fifth clutch means for connecting said ninth gear to said second countershaft for conjoint rotation therewith;
s. a tenth gear journalled for rotation on said second countershaft and in mesh with said eighth gear;
t. sixth clutch means for connecting said tenth gear to said second countershaft for conjoint rotation therewith;
u. an eleventh gear fixed to said output shaft and in mesh with said ninth gear; and
v. a twelfth gear fixed to said output shaft and in mesh with said tenth gear.

3. A multispeed constant-gear-mesh transmission comprising:
a. an input shaft;
b. a first gear fixed to said input shaft;
c. a first countershaft vertically aligned with said input shaft;
d. a second gear journalled for rotation on said first countershaft and drivingly connected with said first gear;
e. a shaft axially aligned with said input shaft;
f. first clutch means for connecting said input shaft with said axially aligned shaft;
g. second clutch means for connecting said second gear to said first countershaft for conjoint rotation therewith;
h. a third gear fixed to said axially aligned shaft;
i. a fourth gear fixed to said first countershaft and in mesh with said third gear;
j. a fifth gear journalled for rotation on one of said first countershaft and said axially aligned shaft;
k. third clutch means for connecting said fifth gear to one of said first countershaft and said axially shafts for conjoint rotation therewith;
l. a second countershaft vertically aligned with said first countershaft;
m. a sixth gear fixed to said first countershaft;
n. a seventh gear fixed to said second countershaft and in mesh with said sixth gear;
o. an eighth gear journalled for rotation on one of said first and second countershafts and in mesh with said fifth gear;
p. fourth clutch means for connecting said eighth gear to one of said first and second countershafts for conjoint rotation therewith;
q. a ninth gear journalled for rotation on said second countershaft;
r. fifth clutch means for connecting said ninth gear to said second countershaft for conjoint rotation therewith;
s. an output shaft vertically aligned with said countershaft;
t. a tenth gear journalled for rotation on said second countershaft and in mesh with said eighth gear;
u. sixth clutch means for connecting said tenth gear to said second countershaft for conjoint rotation therewith;
v. an eleventh gear fixed to said output shaft and in mesh with said ninth gear; and
w. a twelfth gear fixed to said output shaft and in mesh with said tenth gear.

* * * * *